April 15, 1924.
H. L. WADSWORTH
VEHICLE SIGNAL
Filed April 24, 1919
1,490,300
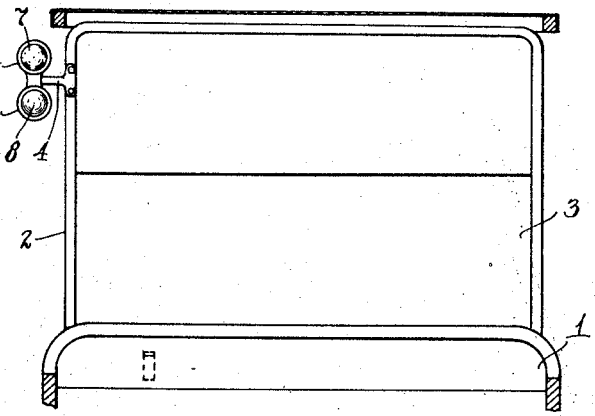
Fig. 1
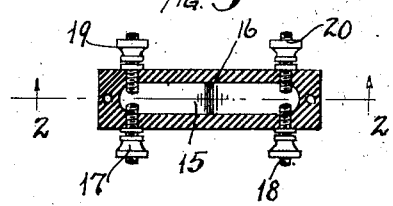
Fig. 2
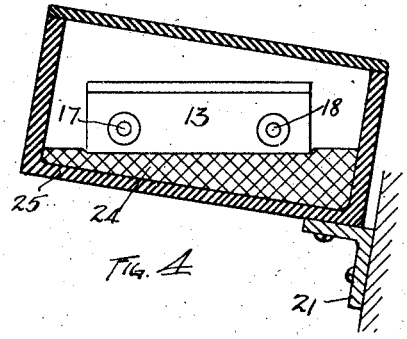
Fig. 3
Fig. 4
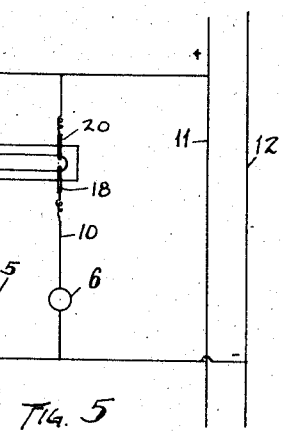
Fig. 5
INVENTOR
Howard L. Wadsworth
By Day, Oberlin & Day.
ATTORNEYS.

Patented Apr. 15, 1924.

1,490,300

UNITED STATES PATENT OFFICE.

HOWARD L. WADSWORTH, OF CLEVELAND, OHIO.

VEHICLE SIGNAL.

Application filed April 24, 1919. Serial No. 292,264.

*To all whom it may concern:*

Be it known that I, HOWARD L. WADSWORTH, a citizen of the United States, and a resident of Cleveland, county of Cuyahoga, and State of Ohio, have invented a new and useful Improvement in Vehicle Signals, of which the following is a specification, the principle of the invention being herein explained and the best mode in which I have contemplated applying that principle, so as to distinguish it from other inventions.

The present invention, relating, as indicated, to signals for vehicles, is particularly designed for use in connection with motor driven vehicles as a convenient and simple means for signalling to following vehicles any increase or decrease in the speed of the vehicle. My improved signal requires no connections to any of the operating parts of the vehicle except a single connection to a source of current supply and is operated automatically and instantly upon any appreciable increase or decrease in the speed of the vehicle. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Fig. 1 is a diagrammatic view showing the windshield of a vehicle with my improved signal mounted thereon; Fig. 2 is a transverse longitudinal section through the operating means for the signal, on the line 2—2, Fig. 3; Fig. 3 is a section on the line 3—3 Fig. 2; Fig. 4 is a view similar to Fig. 2, but showing a modification of the invention; and Fig. 5 is a diagram of the circuit connections.

In Fig. 1, there is shown somewhat diagrammatic the inside of the dash 1 of a motor vehicle upon which is mounted a frame 2 of a windshield 3. Mounted upon one of the side members 2 of the frame is a bracket 4 carrying two signals 5 and 6 of which the signal 5 may consist of an electric light bulb mounted between red lenses 7, while the light 6 consists of a similar bulb mounted between green lenses 8. It will be understood that this signal may be mounted at any convenient point on the vehicle along the side, so that it will show both from ahead and behind, or on the back of the vehicle.

The signals 5 and 6 indicated in Fig. 5 as electric bulbs are connected in parallel by connections 9 and 10, respectively, to the main lines 11 and 12 of an electric circuit, which in most cases will ordinarily be the electric circuit of the vehicle and will be operated by the storage battery or generator carried thereon. Interposed in lines 9 and 10 is a suitable switch mechanism which constitutes means for automatically operating one or the other of the signal lights upon any increase or decrease in the speed of the vehicle. This switch member is shown in Figs. 2 and 3 and consists of an insulating casing 13 with a removable cover plate 14. The casing 13 is provided with a longitudinally extending raceway 15 having each end slighty lower than the center 16. Each of the connections 9 and 10 leads to contacts 17 and 18, respectively, which are projected partially across the end of the raceway 15 in the casing at either end of the same, while corresponding contacts or connections 19 and 20 are similarly disposed on the other side of the casing and are connected as shown in Fig. 5. The casing 13 may be mounted at any convenient point on the vehicle and may be carried on a bracket 21 attached to the dash of the vehicle, if desired, so that it is in a horizontal position in the normal position of the car.

Mounted to move in the raceway 15 is a movable contact member in the form of a globule of mercury 22. This drop of mercury is freely movable from end to end of the raceway and is actuated from one end to the other by an increase or decrease in the momentum of the vehicle. Thus, upon the starting of the vehicle, the mercury will instantly move to the rear end of the raceway 15, when it will make contact with the connections 17 and 19 and close the circuit through the bulb 5, while upon a decrease or stopping of the vehicle, the mercury will pass to the forward end of the casing and make connection between the contacts 18 and 20. The slight raise or hump in the center of the raceway is not sufficient to prevent the passage of the mercury when there is any slight jar or jolt to the vehicle, but is sufficient to hinder the free movement of the mercury upon a real increase or decrease in the speed of the vehicle.

In Fig. 4, I have shown a modification of the device intended for use on vehicles in rough or hilly country in which the casing 13 is floated upon a mercury bath 24 which is in turn carried in an outside case 25 bolted to the dash 1 of the vehicle by means of the bracket 21. In such a construction, the casing 13 and the raceway therein are mounted in an exact horizontal position, irrespective of the inclination of the vehicle itself, so that the vehicle's inclination does not affect the proper operation of the switch.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

A momentum switch adapted to alternately open and close two distinct circuits, comprising an insulating casing, a removable cover plate therefor, a horizontally extending raceway, formed centrally of said casing and having each end slightly lower than the center, a pair of contacts projecting across each end of said raceway, each pair constituting terminals of two distinct electrical circuits, and a globule of mercury disposed within said raceway and adapted to come to rest at either end of said raceway and in contact with said respective terminals to close one of said circuits.

Signed by me, this 21st day of April, 1919.

HOWARD L. WADSWORTH.